United States Patent [19]

Ferguson

[11] 4,271,856
[45] Jun. 9, 1981

[54] FOLDING TENT

[76] Inventor: Robert W. Ferguson, 1521 Granger, Ann Arbor, Mich. 48104

[21] Appl. No.: 91,182

[22] Filed: Nov. 5, 1979

[51] Int. Cl.³ ............................ B60D 3/32; A45F 1/06
[52] U.S. Cl. ....................................... 135/4 A; 296/161
[58] Field of Search .............. 135/1 A, 4 A; 296/156, 296/159, 160, 161, 169, 173

[56] References Cited

U.S. PATENT DOCUMENTS

| | | | |
|---|---|---|---|
| 3,093,150 | 6/1963 | Schaftener et al. | 135/1 A |
| 3,703,311 | 11/1972 | Davis et al. | 296/161 |
| 3,712,316 | 1/1973 | Leonard | 135/4 A X |
| 4,058,133 | 11/1977 | Barr et al. | 296/160 X |
| 4,176,873 | 12/1979 | Barr et al. | 296/156 |

FOREIGN PATENT DOCUMENTS

| | | | |
|---|---|---|---|
| 790920 | 7/1968 | Canada | 135/4 A |
| 2377172 | 9/1978 | France | 135/1 A |

*Primary Examiner*—Karl J. Bell
*Attorney, Agent, or Firm*—Olsen and Stephenson

[57] ABSTRACT

A portable shelter assembly adapted to be mounted in a folded condition for transportation purposes preferably on the top of a motor vehicle, and to be unfolded and distended while supported either on the vehicle or on the ground to provide a tent for shelter purposes. The assembly includes a pair of rigid base sections hingedly secured together at inner edges and foldable to define a container in which the remainder of the tent can be stored, and unfoldable to define a planar platform with upturned forward and after edges on which a flexible cover and frame members can be supported to provide accommodations. A simplified hinge arrangement for the base sections and the associated pivotally supported frame members is provided, and the flexible cover, when distended, provides for interior ventilation and improved exterior drainage.

12 Claims, 9 Drawing Figures

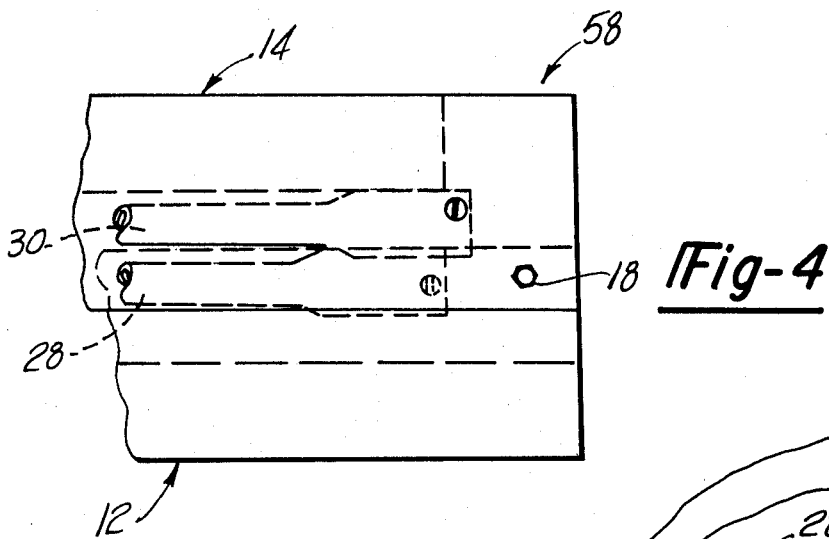
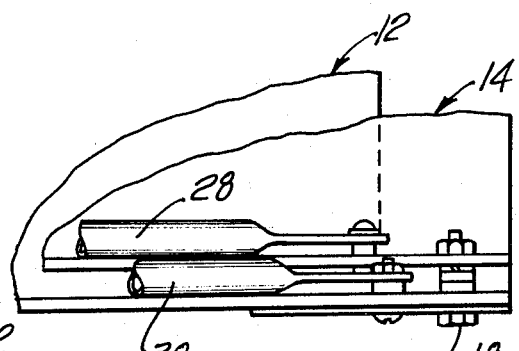
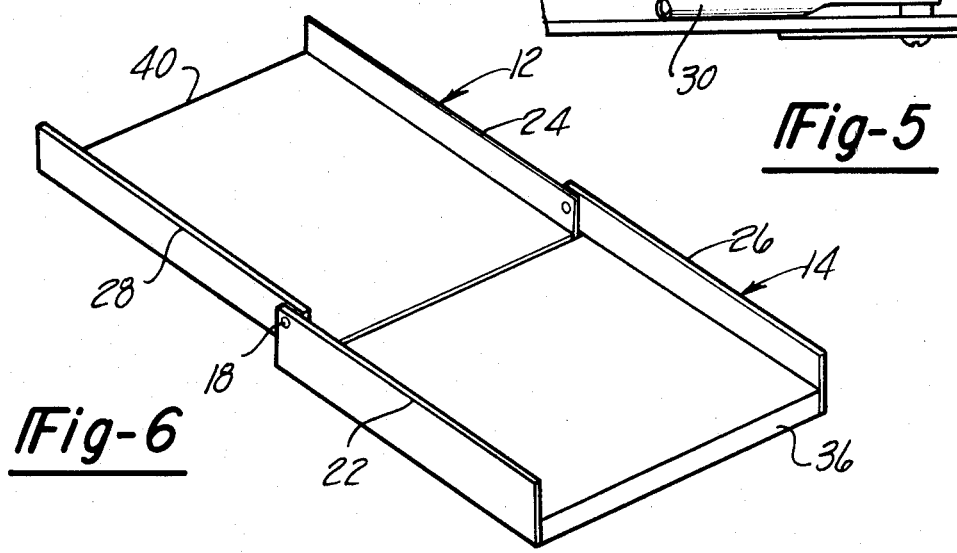
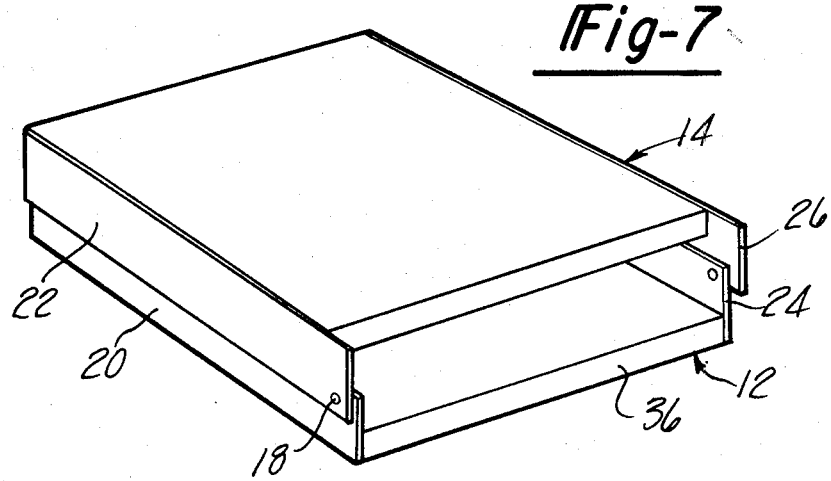

FOLDING TENT

BACKGROUND OF THE INVENTION

The present invention relates primarily to cartop tent facilities which can also be removed from the car top and erected on the ground or on any other suitable supporting surface.

Folding tent assemblies that can be transported and erected on car tops or the like are well known. However, there remains a need for an improved folding tent of this character which is simple in construction to facilitate erection of the tent, especially the initial unfolding of the package tent, and which further provides comfortable accommodations, optimum ventilation properties, which can be stored on the car top in a weather-proof container of relatively small size, and the like.

SUMMARY OF THE INVENTION

The present invention has overcome the inadequacies of the prior art and meets the requirements for an improved folding tent having the desired characteristics set forth above.

According to one form of the present invention, a folding tent is provided which comprises first and second rigid base sections hingedly secured together at their respective inner ends and foldable together to define a container and unfoldable into aligned relation to define a planar platform with upturned forward and after edges. The sections are dimensioned so that the second base section can be folded over the first base section so as to confine the latter in the former in nested relation. Hinge pins extend through the forward and after edges to provide a fore-and-aft axis about which the folding action occurs. A flexible cover provides an enclosure when distended, having a bottom wall conforming to the shape of the planar platform, side walls inclined upwardly and inwardly from the associated side edges of the platform, a top wall connected to and extending from the upper extermity of one side wall to the upper extremity of the opposite side wall, and forward and after walls that extend upwardly from the bottom wall to the top wall. First and second frame members are provided for supporting the flexible cover in its distended position on the platform. Only two frame members are utilized for this purpose, the first frame member having an inverted U-shape with the lower ends pivotally supported adjacent to the hinge pins in the forward and after edges of the first rigid base section, and the upper portion of this frame member extends through a tunnel that is located in the cover at one connection of the top wall and the one side wall. The second frame member has an inverted U-shape with the lower ends pivotally supported adjacent to the hinge pins in the forward and after edges of the second rigid base section, and the upper portion of this frame member extends through a second tunnel that is located in the cover at the other connection of the top wall and the other side wall.

Thus, the present invention is a simplified construction in which only two frame members are required for distending the cover, merely as an incident to unfolding the base sections. Another feature of the present invention is that the rigid base sections have simplified pivot means at their forward and after edges adjacent to which the lower ends of the frame members are pivotally supported.

The present invention also has a closure flap means associated with the one side wall to permit access to the interior of the tent. This closure flap means has a separate flap portion for preventing rain and the like from entering the tent, and it may also have a flap portion in the form of a screen to prevent bugs and the like from entering the tent. For additional ventilation purposes, ventilation flap means are provided in the forward and after walls, and preferably the ventilation flap means are in the shape of isosceles triangles in which the apexes of the triangles are adjacent to the top edges of the tent in which the tunnels are located. The inner sides of the isosceles triangles are adjacent and parallel to the associated side walls. Canopies are provided to minimize entrance of rain water through the ventilation openings. These ventilation flap means also contain at least one impervious flap and a screen which, if desired, may be opened separately.

Another feature of the present invention is the construction and arrangement whereby the cover is distended and then tensioned by the operation frame members and the attachment means for securing the cover to the rigid base sections. When distended and tensioned in this manner the top wall is maintained in a shape to assure optimum drainage of moisture.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 4 is an enlarged fragmentary elevation showing the frame and base assembly in the closed position;

FIG. 5 is a fragmentary top plan view of the frame and base assembly shown in FIG. 4;

FIG. 6 is a fragmentary perspective view showing only the base sections in their open positions;

FIG. 7 is a fragmentary perspective view similar to FIG. 6, but showing the base sections in their closed positions;

DESCRIPTION OF THE PREFERRED EMBODIMENT

Figure 1:
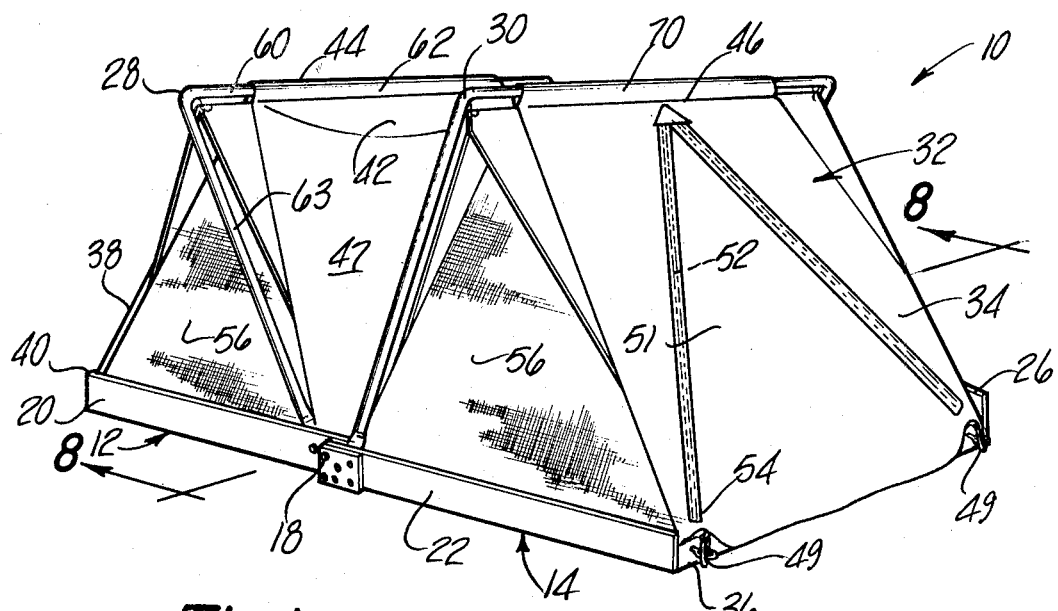
FIG. 1 is a perspective view of a folding tent embodying one form of the invention positioned on a supporting surface and shown in its erected position.
Figure 2:
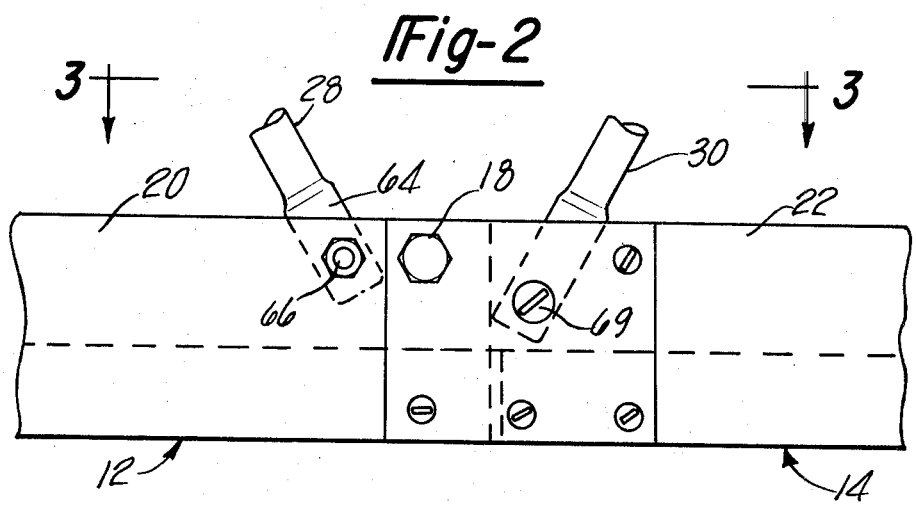
FIG. 2 is an enlarged fragmentary elevation of the frame and base assembly of the folding tent showing the arrangement of the hinge pin and pivot pins in the forward edges of the base sections.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The folding tent 10, which embodies the present invention, is adapted to be transported on the top of a motor vehicle (not shown) when in a folded state and to be erected to the position shown in FIG. 1 while being mounted on the top of the motor vehicle or on any other suitable supporting surface. The folding tent 10 includes a first rigid base section 12 and a second rigid base section 14, which are hingedly secured together at the hinge pins 18 at their inner ends allowing the sections to be folded together to define a container as shown in FIG. 7, and to be unfolded into the position shown in the drawings, FIGS. 1 and 6, wherein they constitute a planar platform having forward edges 20 and 22 and after edges 24 and 26. The dimensions of the upturned forward and after edges are sufficient in a vertical direction so that when the base sections are folded together, the first and second frame members 28 and 30, and the flexible cover 32, as well as a mattress (not shown), can be stored within the confines of the container.

The flexible cover 32 defines an enclosure which when fully distended to the position illustrated in FIG. 1, will have a bottom wall 33 conforming to the shape of the planar platform, one side wall 34 inclined upwardly and inwardly from the associated platform side edge 36, an opposite side wall 38 inclined upwardly and inwardly from the associated platform side edge 40, a top wall 42 extending between the upper extremities 44 and 46 of the side walls 34 and 38, and forward and after walls 47 and 48. To retain the flexible cover 32 within the base sections 12 and 14, suitable attachment means 49 are provided that secure the ends of the cover 32 to the edges 36 and 40, and other suitable attachment means 50 (FIG. 3) are provided that secure the bases of the forward and after walls 47 and 48 respectively to the forward and after edges 20 and 24.

A closure flap means 51 is provided in the one side wall 34, and serves to close the opening 52 in the side wall 34. A suitable zipper or similar releasable attachment mechanism 54 may be provided so that the closure flap means 51 can be opened or closed.

Screens 56 with flap portions behind them are provided in both the forward and after walls 47 and 48. It is not essential that a zipper or similar opening mechanism be provided around the periphery of the screen, but such mechanisms will be provided for use with the interior flaps.

Figure 3:
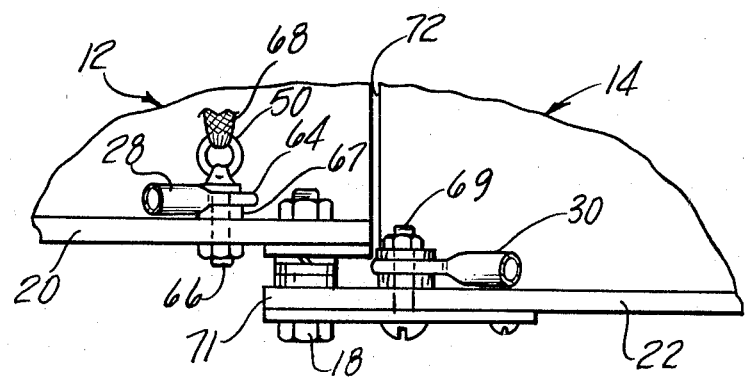
FIG. 3 is a fragmentary section taken on the lines 3—3 of FIG. 2.
Figure 8:
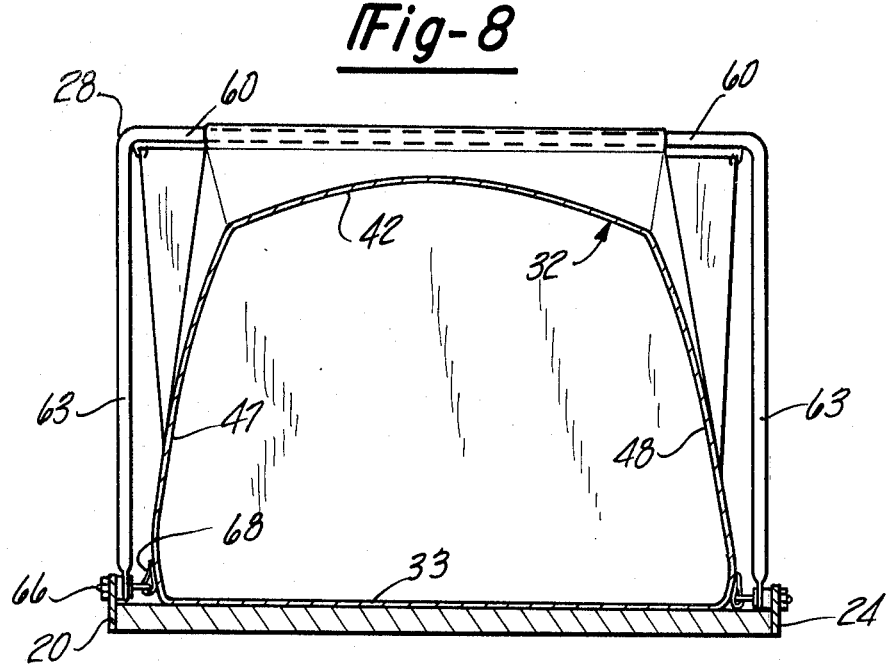
FIG. 8 is a vertical section taken on the lines 8—8 of FIG. 1, showing the tensioned configuration of the walls of the cover of the folding tent.
Figure 9:
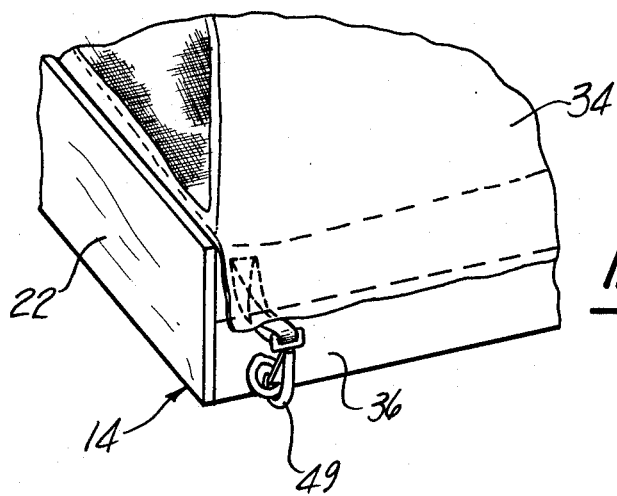
FIG. 9 is an enlarged fragmentary perspective view showing attachment means for securing the side walls of the cover to the ends of the base sections.

The frame and base assembly 58 that is provided for supporting and distending the flexible cover 32 is a relatively simple assembly that includes the first and second frame members 28 and 30 pivotally mounted on the base sections 12 and 14. Both frame members have an inverted U-shape. The first frame member 28 has its lower ends pivotally supported on the forward and after edges 20, 24 adjacent to but outward of the hinge pin 18, and the upper fore-and-aft portion 60 thereof extends along the upper extermity of the side wall 38 and is connected thereto by means of the attachment means or tunnel 62 that is sewn in the cover 32 at the juncture of the side wall 38 with the top wall 42. The frame member 28 has upright portions 63 that extend from its lower ends and are joined by the fore-and-aft portion 60. The other frame member 30 is similarly constructed. The lower end 64 of frame member 28 has a flattened construction with a hole therein through which the pivot pin 66 extends and spacer element 67 maintains the proper alignment. The pin 66 also extends through the forward edge 20. As was previously indicated, the first frame member 28 will fit within the confines of the base section 12 as shown in FIG. 3, and as there shown the attachment means 50 as provided which includes the eyelet on the end of the pin 66 and a strap 68 which is secured to the lower portion of the forward wall 47 to tension the cover 32 to the configuration shown in section in FIG. 8. This configuration assures that proper drainage will always occur from the cover 32 when tent 10 is erected.

The second frame member 30 can be similarly mounted on its pivot pins 69 with its upper portion connected to and extending along the upper extremity of the opposite side wall 34 in the attachment means or tunnel 70 which is sewn in the cover 32 at the juncture of the side wall 34 with the top wall 42. The pivot pins 69 also extend through the edges 22 and 26 and are held in proper alignment by space divider elements. Preferably, the first and second frame members have tubular sections and the pivot ends are flattened, as shown.

In normal use of the folding tent 10, the frame and base assembly 58 and the cover 32 will be either on a surface as shown in FIG. 1, or the first rigid base section 12 will be supported on the top of a motor vehicle and the base section 14 can be supported on a vertical ladder suitably connected at the edge 36. When it is desired to fold the tent into a container, the base section 14 will be folded onto the base section 12 to the position shown in FIG. 4 and the frame members 28 and 30 will be pivoted to the position shown in FIG. 4 as an incident to folding the base section 14 to its closed position. Also, the mattress or pad which is located within the cover 32 on top of the bottom wall will be folded along the fore-and-aft axis extending through the hinge pins 18 so that it will also be stored within the container. To facilitate folding and unfolding of the base sections 12 and 14, the forward and after edges 22 and 26 have extensions 71 through which the pivot pins 18 extend and normally a small gap 72 will exist between the base sections 12 and 14 to allow free movement of the base section 14 relative to the base section 12 during these folding and unfolding operations. The gap 72 is of no consequence during the use of the folding tent 10, because the bottom wall of the cover 32 will extend across the gap 72, as will the pad or mattress (not shown) that is located within the cover 32. When unfolding the base sections 12 and 14, the tent will be distended by action of the frame members 28 and 30 and the cover 32.

As previously indicated, the dimensions of the frame members 28 and 30 are such that they fit within the confines of their respective base sections 20 and 22 when the latter are folded in a closed position to define a container. For transportation purposes, a separate cover can then be fitted over the closed container to protect the container.

It is claimed:
1. In a folding tent adapted to be mounted on a vehicle top or on other suitable supporting surfaces, a frame and base assembly comprising
first and second rigid base sections hingedly secured together in a fore-and-aft direction at their respective inner ends and foldable together with the first base section nested in the second base section so as to define a container and unfoldable laterally apart into aligned relation to define a planar platform, said base sections when in their unfolded positions having upturned forward and after edges, said first base section having a smaller fore-and-aft dimension than said second base section to facilitate nesting the base sections together, said second base section having extensions from its forward and after edges overlapping the corresponding edges of said first base section, and hinge pins extending through said extensions and said corresponding edges to provide the hinge connections between the first and second rigid base sections; and first and second U-shaped frame members hingedly connected at their ends respectively to said first and second rigid base sections, each frame member having upright portions extending from said ends and joined by a fore-and-aft portion, the ends of said first frame member being on the inboard side of said forward and after edges of said first base sections and connected by pivot pins extending through the first base section edges adjacent to said hinge pins and laterally outward thereof, and the ends of said second frame member being on the inboard side of said forward and after edges of said second base section and connected by pivot pins extending through the second base section edges adjacent to said hinge pins and laterally outward thereof.

2. In a folding tent, the frame and base assembly that is defined in claim 1, wherein said first and second rigid base sections have upturned edges only on said forward and after edges and the laterally inner and outer ends of the base sections are free of edges, and said first and second U-shaped frame members are dimensioned so that they are confined within the ends of said base sections when the base sections are folded together.

3. In a folding tent, the frame and base assembly that is defined in claim 1, wherein said first and second U-shaped frame members are tubular elements that have flat portions at their hinge ends through which said pivot pins extend, and said first and second base sections are dimensioned so that when folded together their respective forward and after edges are in spaced-apart relation and tubular portions of said second U-shaped frame members are aligned to allow them to be seated on said forward and after edges of said first base section.

4. In a folding tent, the frame and base assembly that is defined in claim 1, in combination with a cover supported on said frame and base assembly to provide a distended enclosure when said base sections are in their unfolded positions.

5. In a folding tent, the combination that is defined in claim 4, wherein said cover has two sets of tunnels that extend in parallel relationship in a fore-and-aft direction through its top wall and through which said U-shaped frame members pass for securing the top wall of the cover to the fore-and-aft portions of the frame members, and attachment means secure said cover to the laterally outer ends of said base sections so that when said base sections are unfolded to define a planar platform the cover will be fully distended by pivotal movement of the frame members caused by the unfolding of the base sections and tensioning of the cover.

6. In a folding tent, the combination that is defined in claim 5, wherein the upright portions of the frame members at the forward and after walls of the cover define inverted V-shape configurations when the cover is distended.

7. In a folding tent, the combination that is defined in claim 6, wherein additional attachment means secure said cover to said forward and after edges at the apexes of said V-shape configurations, said additional attachment means directly tensioning said cover to draw it into bowed form in a fore-and-aft direction extending from one additional attachment means to the other.

8. A folding tent comprising first and second rigid base sections hingedly secured together in a fore-and-aft direction at their respective inner ends and foldable together with the first base section nested in a second base section so as to define a container and unfoldable into aligned relation to define a planar platform with upturned forward and after edges;

a flexible cover defining an enclosure when fully distended, said cover when distended having a bottom wall conforming to the shape of said planar platform, side walls inclined upwardly and inwardly from the laterally outer edges of the platform, a top wall extending between the upper extremities of the side walls, and forward and after walls extending upwardly to said top wall, one of said walls having a closure flap means for entering and leaving the enclosure; and first and second U-shaped frame members for supporting said flexible cover in its distended position on said planar platform, said first and second U-shaped frame members being hingedly connected at their ends respectively to said first and second rigid base sections, the ends of said first frame member being on the inboard side of said forward and after edges of said first base section and connected by pivot pins extending through the first base section edges adjacent to said hinge pins laterally outward thereof, and the ends of said second frame member being on the inboard side of said forward and after edges of said second base section and connected by pivot pins extending through the second base section edges adjacent to said hinge pins and laterally outward thereof.

9. The folding tent that is defined in claim 8, wherein said cover has fore-and-aft tunnels at the junctions of the top wall with the side walls, and attachment means adjacent to the lower ends of the side walls connected to the laterally outer ends of said base sections, and said U-shaped frame members pass through said tunnels so that when the base sections are unfolded to define a planar platform the cover will be fully distended by pivotal movement of the frame members caused by the unfolding of the base sections and the tensioning of the cover.

10. In a folding tent, the combination that is defined in claim 9, wherein additional attachment means secure said cover to said forward and after edges at the apexes of said V-shape configurations, said additional attachment means directly tensioning said cover to draw it into bowed form in a fore-and-aft direction extending from one additional attachment means to the other.

11. A folding tent comprising first and second rigid base sections hingedly secured together in a fore-and-aft direction at their respective inner ends and foldable together with the first base section nested in the second base section so as to define a container and unfoldable into aligned relation to define a planar platform with upturned forward and after edges;

a flexible cover defining an enclosure when fully distended, said cover when distended having a bottom wall conforming to the shape of said planar platform, side walls inclined upwardly and inwardly from the laterally outer edges of the platform, a top wall extending between the upper extremities of the side walls, and forward and after walls extending upwardly to said top wall; and first and second U-shaped frame members for supporting said flexible cover in its distended position on said planar platform, said first and second U-shaped frame members being hingedly connected at their ends respectively to said first and second rigid base sections, each frame member having upright portions extending from its ends and joined by fore-and-aft portions, the ends of said first frame member being connected by pivot pins in the first base section adjacent to said hinge pins and laterally outward thereof, and the ends of said second frame member being connected by pivot pins in the second base section adjacent to said hinge pins and laterally outward thereof;

said cover having first attachment means at the junctions of the top wall with the side walls connected to said fore-and-aft portions of the frame members, second attachment means adjacent to the lower ends of the side walls connected to the laterally outer ends of said base sections, and additional attachment means adjacent to said hinge pins for securing said cover to said forward and after edges, said additional attachment means directly tensioning said cover to draw it into bowed form in a fore-and-aft direction extending from one additional attachment means to the other.

12. The folding tent that is defined in claim 11, wherein said upright portions of the frame members are essentially in vertical planes adjacent to the forward and after edges of said base sections, said forward and after walls converge upwardly out of said vertical planes, and said walls provide canopies that extend upward from the inner and outer ends of each base section to the fore-and-aft portions of the associated frame members, the portions of the front and rear walls that are within said canopies having screens for ventilation purposes.

* * * * *